United States Patent [19]

Kern

[11] Patent Number: 4,525,971
[45] Date of Patent: Jul. 2, 1985

[54] ATTACHMENT CLIP FOR SUSPENDED WOODBEAM CEILING

[76] Inventor: Gilbert G. Kern, 515 N. Victory Blvd., Burbank, Calif. 91502

[21] Appl. No.: 598,410

[22] Filed: Apr. 9, 1984

Related U.S. Application Data

[60] Division of Ser. No. 407,652, Aug. 12, 1982, Pat. No. 4,464,879, which is a continuation-in-part of Ser. No. 259,858, May 4, 1981, Pat. No. 4,454,700, which is a continuation-in-part of Ser. No. 28,904, Apr. 10, 1979, Pat. No. 4,281,498.

[51] Int. Cl.³ .............................................. E06B 3/54
[52] U.S. Cl. ...................................... 52/484; 52/665; 403/232.1; 403/237
[58] Field of Search ................. 52/780, 781, 665, 484; 403/232.1, 237, 346

[56] References Cited

U.S. PATENT DOCUMENTS 1,940,933 12/1933 Balduf ............................ 52/DIG. 8
2,611,160 9/1952 Hanesse ............................ 403/237
3,232,021 2/1966 Wilson ................................ 52/484
3,329,387 7/1967 Fischer ............................... 52/781
3,444,801 5/1969 Lambert ............................. 52/731
3,752,512 8/1973 Gilb ................................ 403/232.1
3,783,771 1/1974 Hartzell ............................. 52/484
4,033,083 7/1977 Fritz .................................. 52/484
4,047,348 9/1977 McSweeney ....................... 52/484
4,198,175 4/1980 Knepp ............................ 403/232.1
4,261,470 4/1981 Dolan ................................ 403/237
4,367,616 1/1983 Pearson ............................. 52/665

*Primary Examiner*—Henry E. Raduazo
*Attorney, Agent, or Firm*—Bernard P. Drachlis

[57] ABSTRACT

The suspended woodbeam ceiling is formed of a plurality of beams which lie spaced from each other and at right angles from each other to receive drop-in ceiling panels therebetween. These beams are interconnected with each other with the attachment clip of this invention. The attachment clip engages on one beam by spring teeth engaging in the body of the wood and connects it to an adjacent beam by hooking thereover.

7 Claims, 3 Drawing Figures

ATTACHMENT CLIP FOR SUSPENDED WOODBEAM CEILING

CROSS REFERENCE

This application is a division of my application Loc 753 Status 100 Ser. No. 407,652 filed Aug. 12, 1982 for "Suspended Woodbeam Ceiling Construction," now U.S. Pat. No. 4,464,879 and that application was a continuation-in-part of my earlier filed application Ser. No. 259,858 filed May 4, 1981, entitled "Suspended Woodbeam Ceiling," now U.S. Pat. No. 4,454,700 which, in turn, was a continuation-in-part of my earlier filed application Ser. No. 28,904 filed Apr. 10, 1979, entitled "Suspended Woodbeam Ceiling," now U.S. Pat. No. 4,281,498.

BACKGROUND

This invention is directed to a suspended woodbeam ceiling construction and more particularly to the attachment clip for the interconnection and support of the woodbeams of the suspended ceiling.

Many commercial buildings have overhead air conditioning duct work, pipes and electrical wiring. A suspended ceiling is positioned therebelow to provide a ceiling for the personnel space. The suspended ceiling is often in the shape of an inverted T-bar which is hung on wires from the overhead. Drop-in ceiling panels lie on the crossbars of the T. This permits ready removal of the panels to execute repairs to the overhead equipment.

Some older homes have high ceilings, and it is desirable to install a suspended ceiling therein. Other homes have plaster ceilings which require extensive repair. In such cases, a suspended ceiling is desirable. Furthermore, in modern construction, translucent light panels and opaque decorative panels can serve to enhance decor, particularly of a room which can be enhanced by subdued overhead lighting. There is need for attachment devices which suitably secure together woodbeams of such suspended ceilings.

SUMMARY

In order to aid in the understanding of this invention, it can be stated in essentially summary form that it is dirrected to a suspended woodbeam ceiling construction and particularly to the attachment clips which attach to the wooden beams for their attachment to adjacent structure.

It is, thus, an object of this invention to provide a suspended woodbeam ceiling construction which is aesthetic so that it can be employed in locations where an attractive woodbeam ceiling is desirable. It is another object of this invention to provide a woodbeam ceiling construction wherein a beam is formed of a center with two sides, each being made of wood or simulated wood so that the sides present lips for the support of drop-in ceiling panels. It is a further object to provide attachment devices which attach such beams to each other so that the beams and the ceiling panels associated therewith are properly joined and supported.

Other objects and advantages of this invention will become apparent from a study of the following portion of the specification, the claims and the attached drawings.

DESCRIPTION OF THE PREFERRED EMBODIMENT

Figure 1:
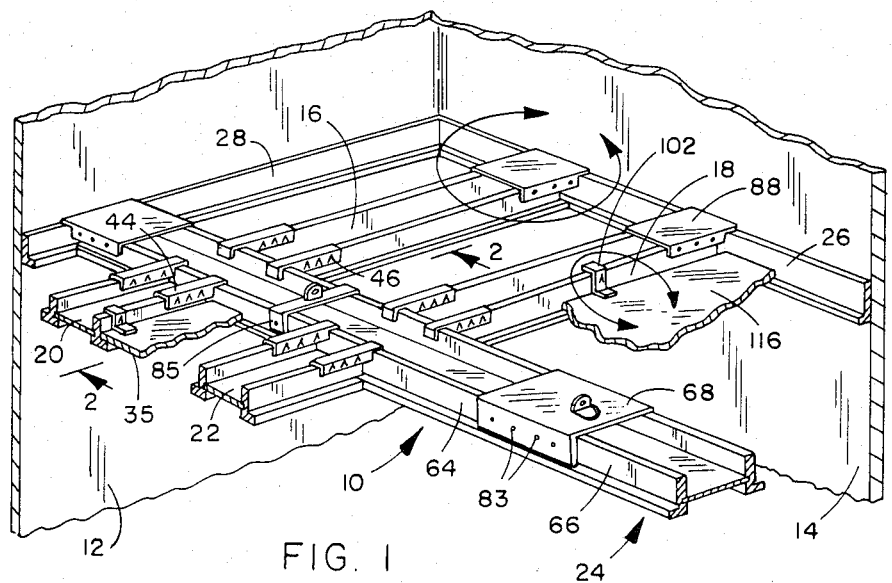
FIG. 1 is an isometric view of a suspended woodbeam ceiling with which the attachment clip in accordance with this invention is used, with parts broken away and parts taken in section.

FIG. 1 shows the suspended woodbeam ceiling 10 of this invention as being positioned in a room having walls 12 and 14. The walls intersect at a right angle and enclose a space above the ceiling. The upper space may contain conventional electrical, lighting, and plumbing, as well as heating, cooling, and ventilation equipment. In the usual room, there are two other walls, and the ceiling 10 extends to those two other walls. Ceiling 10 in FIG. 1 generally comprises a plurality of crossbeams 16, 18, 20, and 22. Crossbeams 20 and 22 are broken away in FIG. 1. FIG. 1 also shows main beam 24 and wall hangers 26 and 28.

Figure 2:
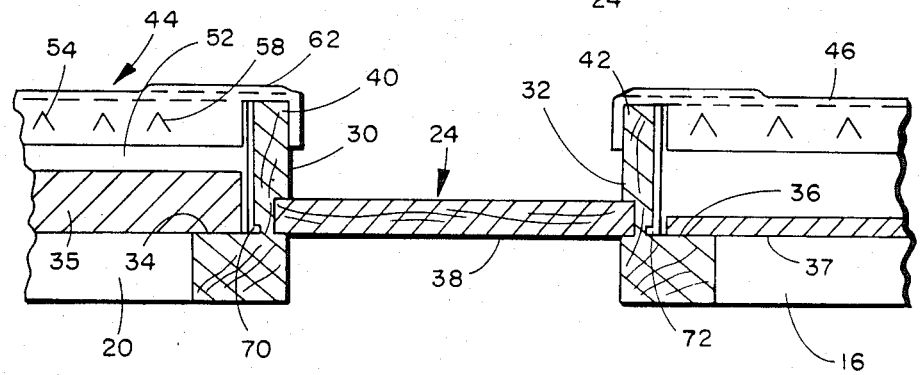
FIG. 2 is an enlarged section taken generally along the line 2—2 of FIG. 1, showing the two attachment clips on crossbeams engaging the main beam and showing the ceiling panels supported thereby.

FIG. 2 shows the cross-section of the main beam 24 and the manner in which the metallic attachment clips attach the crossbeams 16 and 20 to the main beam 24. Main beam 24 has beam sides 30 and 32 which are of L-shape configuration. This shape provides lips 34 and 36 on the beam sides which extend away from the center of the beam so that the drop-in ceiling panels can rest thereon. Opaque ceiling panel 35 is shown on the left side of FIG. 2 and translucent ceiling panel 37 is shown on the right side.

Beam center 38 is secured into the beam sides, as by rabbeting and glueing, as indicated. Preferably, the bottom of the beam center 38 is in the same plane as the lips 34 and 36, for appearance purposes, but other configurations are feasible. The upstanding webs 40 and 42, respectively, of beam sides 30 and 32 provide beam strength to the structure and provide an attachment point for the crossbeams. The structure comprises of beam sides 30 and 32, together with beam center 38, is permanently assembled and is considered a main beam.

In the preferred embodiment, the main beams and crossbeams are preferably made of wood, and the three elements of the beams are glued together and may have additional fastening means. In an alternate embodiment, the beams may be extruded of thermoplastic, synthetic polymer composition material, and in such a case, the beams are preferably configured and colored to resemble wood.

As seen in FIG. 1, main beam 24 extends the entire distance along the length of the room, from one wall to the other, except for the short length provided by the thickness of the opposing wall hangers. Main beam 24 is supported from the overhead by means of wires engaged wth respect to the main beam, such as by the hanger clip 68 illustrated in FIG. 1. Since the woodbeam ceiling of the present invention has much greater strength than the standard T-bar suspended ceiling, the number of suspension wires necessary for the installation of the wood beam ceiling is greatly reduced.

Crossbeams 16 and 20, as well as other crossbeams and main beams, have the same cross-section as main beam 24. As is seen in FIGS. 1, 2 and 3, locking clip 44 is used to join crossbeam 20 to the side of main beam 24.

Other locking clips of the same construction are used to join each of the other side beams 16, 18 and 22 to the sides of main beam 24. Such an additional locking clip 46 is illustrated in FIGS. 1 and 2. Furthermore, two such locking clips are employed to secure the end of each crossbeam to the side of a main beam, as is shown in FIG. 1. Each of the locking clips is identical.

Figure 3:
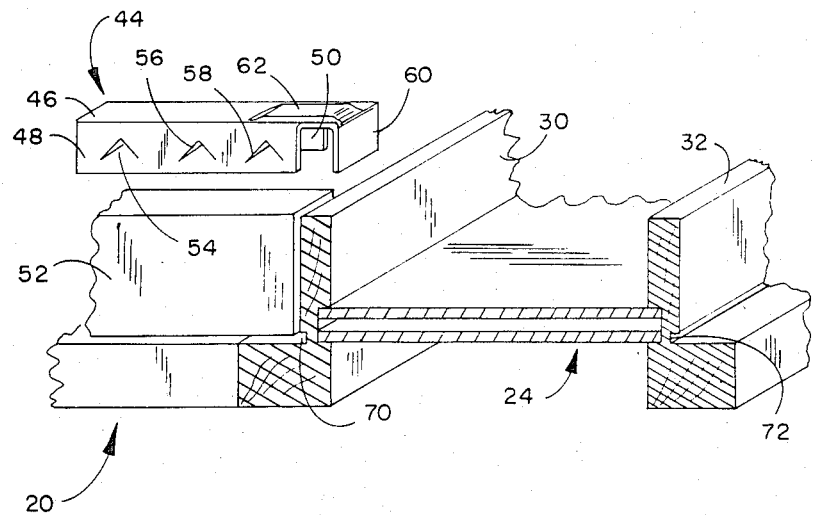
FIG. 3 is a perspective view showing the attachment clip of this invention used for attaching the crossbeams to the main beam.

Locking clip 44, illustrated in FIG. 3, has a main body in the shape of a channel. The channel has web 46 and flanges 48 and 50. The channel is configured to firmly embrace over the upstanding portion of the beam side 52, illustrated in FIG. 3. Furthermore, the flanges have resilient teeth formed therein. Teeth 54, 56 and 58 are illustrated in FIG. 3. They are pressed inward out of the material of the flange to have upwardly and inwardly directed points. The locking clip 44 is formed of sheet metal, from which such teeth can be reaily formed. The teeth are directed upward so that the U-shaped channel can be pressed down upon beam side 52 and, when in place, the teeth engage in the sides of the wooden beam side 52 to inhibit removal of the clip. The forward end of locking clip 44 is formed with hook 60 which engages across the top of and down the inside of beam side 30 to retain crossbeam 20 in the endwise direction against the side of main beam 24. Rib 62 is formed along at least the forward portion of web 46 to strengthen hook 60. Thus, by installation of the several locking clips (including the locking clip 44), the crossbeams are held securely in place against the main beam.

When the room is long, it may be that it takes more than one section to provide a main beam 24 which is sufficiently long to span the room. As is seen in FIG. 1, sections 64 and 66 are butted end-to-end to provide the necessary span. In order to hold the ends of the sections 64 and 66 in alignment and to support them, extension hanger 68 is provided. In order to receive the fingers of extension hanger 68, the beam sides 30 and 32 are each provided with an undercut notch at the level of the lip. Notches 70 and 72 are seen in FIG. 3. These notches are in line with lips 34 and 36 and are cut into the beam sides 30 and 32 on the lip side thereof. Extension hanger 68 is formed of sheet metal, is of generally inverted U-shaped configuration, and has screw holes 83 in its flanges. After the extension hanger 68 is in place, it may be more permanently secured by screws through holes 83.

Support hanger 85 is shown in FIG. 1 as support for the beam 64 at selected positions along its length. Support hanger 85 is identical to extension hanger 68, except for its shorter length along the length of the beam. Support hanger 85 has fingers which engage in the notches in the beam, and it has an upstanding tab to which a support wire can be secured.

FIG. 1 illustrates wall rail connector 88. Wall hanger 26 is secured to the wall with its bottom edge positioned to be in line with the bottom surfaces of the main beams and crossbeams.

FIG. 1 also illustrates ceiling panel holddown clip 102 which is of inverted U-shaped configuration. The U is spaced to embrace the beam side. A spring tooth is stamped into the clip. The resilience and dimensions are such that the tooth engages into the beam side to retain clip 102 in place. A finger is formed on the clip 102 with the finger positioned to engage on the top of ceiling panel 116 which rests on the lip of crossbeam 18. Several of such holddown clips 102 are provided to hold the several ceiling panels in place so that quick changes in air pressure do not cause the ceiling panels to rattle.

Each of the devices described in this specification for support, alignment maintaining, attachment and holddown may be made of stamped sheet metal. The various parts are sufficiently strong to achieve their purposes and have sufficient resiliency so that the teeth by which several of them are held in place are resilient and strong to achieve the desired degree of attachment. Sheet steel is suitable material, but other materials are also suitable. Several of the devices can be cut from extruded thermoplastic synthetic polymer composition material, while locking clip 44 can be injection-molded of similar material. The various devices cooperate together to provide a firm suspended woodbeam ceiling construction which can be readily and accurately assembled.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An attachment clip in combination with a suspended woodbeam ceiling wherein said woodbeam ceiling comprises:
   a first beam, said first beam comprising first and second upstanding longitudinal woodbeam side members, a beam center attached to and positioned between said woodbeam side members to maintain said side members in spaced relationship;
   a second beam, said second beam comprising at least a first longitudinal woodbeam side member, said second beam lying at right angles to said first beam so that both of said upstanding woodbeam side members on said first beam lie against said longitudinal woodbeam side member of said second beam, and wherein said attachment clip comprises:
   a body having a web and first and second flanges forming an inverted U-shaped body, said inverted U-shaped body being sized to fit down over the top of one of said first and second upstanding longitudinal woodbeam side members to retain said body on the side member of said first beam, and a hook on said body for engaging over said side member of said second beam to retain said first beam adjacent said second beam, and a strengthening rib formed in said web adjacent said hook to strengthen said hook where it extends beyond said flanges.

2. An attachment clip in combination with a suspended woodbeam ceiling wherein said woodbeam ceiling comprises:
   a first beam, said first beam comprising first and second upstanding longitudinal woodbeam side members, a beam center attached to and positioned between said woodbeam side members to maintain said side members in spaced relationship;
   a second beam, said second beam comprising at least a first longitudinal woodbeam side member, said second beam lying at right angles to said first beam so that both of said upstanding woodbeam side members on said first beam lie against said longitudinal woodbeam side member of said second beam, and wherein said attachment clip comprises:
   a body having a web and first and second flanges forming an inverted U-shaped body, inwardly directed points on both said flanges, said attachment clip being made of stamped metal and said inwardly directed points being stamped from said flanges to extend into the interior U-shaped channel between said flanges, said inverted U-shaped body being sized to fit down over the top of one of said first and second upstanding longitudinal woodbeam side members of said first beam with said points engaging in said upstanding longitudinal woodbeam side member upon which it is engaged to retain said body of said attachment means onto said beam;

a hook formed on said body, said hook being for engaging over said side member of said second beam to retain said first beam adjacent said second member, a strengthening rib formed in said web adjacent said hook to strengthen said hook where it extends beyond said flanges.

3. First and second attachment clips in combination with a suspended woodbeam ceiling wherein said woodbeam ceiling comprises:
- a first beam, said first beam comprising first and second longitudinal woodbeam side members, a beam center attached to and positioned between said woodbeam side members to maintain said side members in spaced relationship;
- a second beam, said second beam comprising at least a first longitudinal woodbeam side member, said second beam lying at right angles to said first beam so that both of said upstanding woodbeam side members on said first beam lie against said longitudinal woodbeam side member on said second beam, and wherein said first and second attachment clips each comprise:
- a body having a web and first and second flanges forming an inverted U-shaped body, and a hook on said body, a strengthening rib formed in said web adjacent said hook to strengthen said hook where it extends beyond said flanges, said first attachment clip being engaged on said first upstanding longitudinal woodbeam side member of said first beam and said second attachment clip being engaged over said second upstanding longitudinal woodbeam side member of said first beam, with said hooks on both of said first and second attachment clips being engaged over said side member of said second beam.

4. The combination of claim 3 wherein both said attachment clips are made of resilient sheet metal and spring teeth are formed in at least one of said flanges, said spring teeth being directed away from the open side of said U-shaped attachment clip for attaching said attachment clips to the wood of said wooden beam.

5. An attachment clip for a suspended woodbeam ceiling which includes a first beam having first and second upstanding longitudinal woodbeam side members and a second beam having an upstanding longitudinal woodbeam side member with the second beam lying at right angles to the first beam so that both of the side members on the first beam lie against the side member of the second beam, said attachment clip comprising:
- a body having a web, and having first and second flanges attached to said web to form an inverted U-shaped body, said attachment clip being made of stamped metal and having inwardly directed points stamped from said flanges and extending into the interior U-shaped channel between said flanges, said points being directed toward said web, with said points extending into the interior U-shaped channel between said flanges;
- a hook on said body, a strengthening rib formed in said web adjacent said hook to strengthen said hook where it extends beyond said flanges, said U-shaped body being sized to fit over the top of one of the upstanding longitudinal woodbeam side members of the first beam and said hook being sized for engaging over the upstanding longitudinal woodbeam side member of the second beam so as to secure the second beam with respect to the first beam.

6. First and second attachment clips for use with a suspended woodbeam ceiling having a first beam which has first and second spaced upstanding longitudinal woodbeam side members and a second beam lying at right angles to the first beam and having a longitudinal woodbeam side member lying across the ends of both of the said members of the first beam, said first and second attachment clips each comprising:
- a body having a web and first and second flanges attached to said web to form an inverted U-shaped body, said inverted U-shaped body being sized so that said first attachment clip is sized to fit down over the top of said first upstanding longitudinal woodbeam side member of said first beam and said second attachment clip is sized to fit down over the top of said second upstanding longitudinal woodbeam side member of said first beam to retain said attachment clips onto said first beam; and
- a hook on each of said bodies, a strengthening rib formed in said web adjacent said hook to strengthen said hook where it extends beyond said flanges, both of said hooks being sized to fit down over the upstanding longitudinal woodbeam side member of the second beam to retain the first beam adjacent the second beam.

7. The clips of claim 6 wherein both said attachment clips are made of resilient sheet metal and inwardly directed points are formed in at least one of said flanges, said points being directed away from the open side of said U-shaped attachment clip for securing said attachment clips to the wood of said wooden beam.

* * * * *